Nov. 24, 1931.                G. DICKERSON                1,833,209

LATCH MECHANISM

Filed May 21, 1929

INVENTOR
George Dickerson
BY
C. F. Heinkel
ATTORNEY

Patented Nov. 24, 1931

1,833,209

UNITED STATES PATENT OFFICE

GEORGE DICKERSON, OF CLEVELAND, OHIO

LATCH MECHANISM

Application filed May 21, 1929. Serial No. 364,774.

An object of my invention is to provide a simple latch mechanism wherein a seal can be applied and extended through two relatively movable members of the mechanism and wherein parts of the mechanism can not be forced out of place to release the latch mechanism without opening the seal. Other and more specific objects will be pointed out herein and other objects will become apparent or obvious or will suggest themselves upon an inspection of this specification and the accompanying drawings.

In freight cars, for instance, a latch mechanism is provided between the door and the door frame of the car. Usually no lock and key means is provided in such places but provision is made to attach a seal somewhere on the latch mechanism after the door is closed which must be broken or opened before the door can be opened.

These seals are made of resilient material and in open loop form, normally open, and are closed against the action of the resiliency therein after they are inserted in the closed latch mechanism, usually having a catch means to hold them in closed position, and one of the ends of the seal is then bent over the other end to retain the seal in closed position.

The seal is made of material which permits of one bend but will break if it is bent in the opposite direction at the same point. Therefore, if a closed end of the seal is bent back, or if the seal is cut at any place, the resiliency in the seal material at once opens the cut or break and shows at a glance of the inspectors or police that the latch mechanism has been tampered with so that an inspection of the contents of the car can be made to see whether or not any goods have been removed and, if any have been removed, to start tracing the same before the car is moved to a more remote place.

In previous latch mechanisms, it is possible to force members of the mechanism apart, by breaking off bolt heads or other parts, and thereby release the latch mechanism without disturbing the seal and thereby make it appear that the door had not been opened although it may have, in fact, been opened.

The present invention aims to eliminate all projecting bolt heads and other parts which may afford an opportunity for opening of the latch mechanism without opening the seal.

For illustration purposes and not for limitation purposes, the invention is illustrated in the accompanying drawings in one type of mechanism and this one type is specifically described in this specification.

In the accompanying drawings:—

Similar reference characters refer to similar parts throughout the views.

Figure 1:
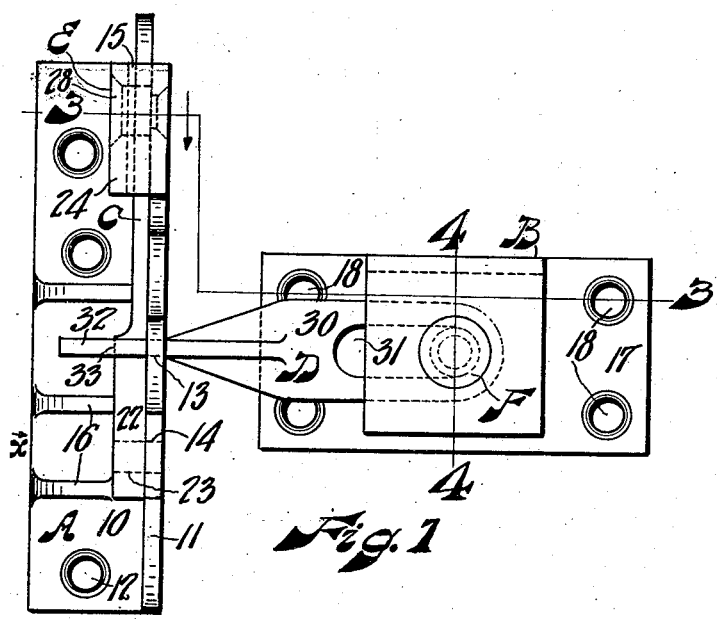
Fig. 1 is a side view of a latch mechanism embodying my invention.
Figure 2:
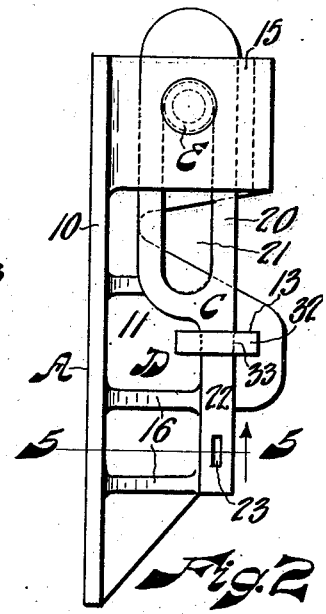
Fig. 2 is an end view taken from the end X of Fig. 1.
Figure 3:
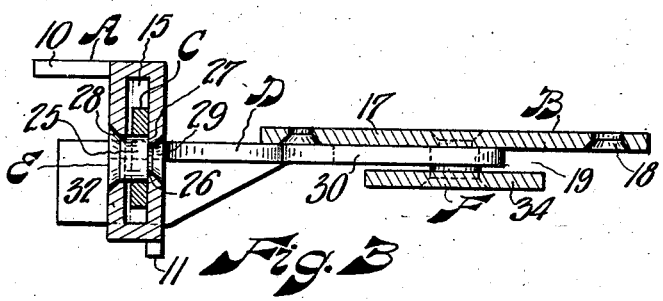
Fig. 3 is a section taken in a plane indicated by the line 3—3 in Fig. 1 showing the bolt head concealing and the shouldered concealed catch bolt supporting pin more clearly.
Figure 4:
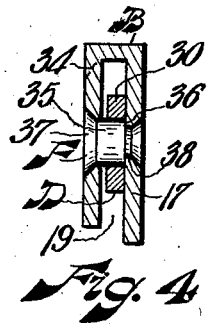
Fig. 4 is a section taken in a plane indicated by the line 4—4 in Fig. 1 showing the pocket and concealed latch bolt supporting pin more clearly.

The mechanism shown in the drawings comprises, principally, the brackets A and B, the catch and latch bolts C and D, and the latch bolt supporting pins E and F.

The bracket A has the two walls 10 and 11 with the countersunk holes 12 through the wall 10 so that flat head screws or bolts can be used to eliminate the possibility of breaking off or cutting off the bolt heads to release the latch mechanism. The wall 11 has the catch bolt hole 13 through the same, and also has the seal receiving hole 14 through the same, and also has the pocket 15.

The walls of the bracket A are stiffened by the rib 16 to prevent the walls from being bent out of position.

The bracket B has the wall 17 with the bolt holes 18 through the same and countersunk so that flathead or countersunk head bolts or screws can be used to fasten the bracket onto a support so that bolt heads can not be chipped off or broken off easily.

The bracket B also has the pocket 19 which is open at the bottom.

The catch bolt C has the body portion 20 extending into the pocket 15 and having the slot 21 through the body portion. The catch bolt C also has the nose 22 with the seal receiving hole 23 through the same and in alinement with the seal receiving hole 14 when all of the members are in latching position.

The catch bolt suspension pin E extends through the wall 11 and the wall 24 and traverses the pocket 15. The body portion 25 of the pin E extends through the slot 21 and the diametrically reduced portion 26 extends into the wall 11 so that the shoulder 27 abuts the wall 11. The part 28 of the pin E is riveted into the countersunk holes in the wall 24 and the part 29 of the pin E is riveted into the countersunk hole in the wall 11. This pin mounting eliminates all bolt heads or other projections from the outside of the bracket A so that the pin can not be removed to effect an unlatching of the latch members. The formation of the pocket 15 also prevents the member C from being removed from the mechanism.

The latch bolt D has the body portion 30 with the slot 31 through the same and extending into the pocket 19 and also has the nose 32 extendable through the hole 13 in the wall 11 and also has the hole 33 for the nose 22.

The latch bolt suspension pin F extends through the walls 17 and 34 and traverses the pocket 19. The part 35 of the pin F extends through the solt 31 in the part 30 and has the shoulder 36 abutting the wall 17. The part 37 of the pin F is riveted into the countersunk hole in the wall 34. The diametrically reduced portion 38 of the pin F extends through the wall 17 and is riveted into the countersunk hole in the wall 17. This countersunk structure eliminates all bolt heads or other projecting parts which could easily be chipped or broken off.

The brackets A and B are fastened to the door frame and the door thereof by means of flathead or countersunk head screws or bolts extending through the holes 12 and 18 and are spaced or located in such relation to each other that the nose 32 of the latch bolt D can be extended through the hole 13 in the wall 11 of the bracket A and the nose of the catch bolt C can be extended through the hole 33 in the nose 32 of the latch bolt D.

The seal G is extended through the holes 14 and 23 when the latch members are in latching position and is then locked in the usual manner.

Figure 5:
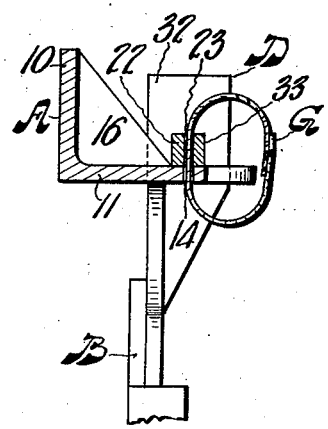
Fig. 5 is a section taken in a plane indicated by the line 5—5 in Fig. 2 showing a seal applied to two relatively movable members.

As shown in the drawings the members are in latching position with the seal G applied as best seen in Fig. 5.

In order to unlatch the members the seal G must first be removed in some manner before the catch bolt C can be moved since the seal G also extends through the positionally fixed wall 11 and thereby prevents the catch bolt C from being moved unless the seal is first removed.

After the seal is removed the member C can be moved longitudinally and is guided on the pin E and on the wall 11 until the end of the nose 22 thereof is clear of the nose 32 on the latch bolt D; the slot 21 permitting the longitudinal movement of the member C.

After the member C is so moved, the latch bolt D can be moved longitudinally through the hole 13 and clear of the wall 11 whereupon the bracket A and the mechanism thereon and the bracket B and the mechanism thereon are clear of each other and the members upon which the brackets A and B are fastened can move in relation to each other. The slot 31 permits the longitudinal movement of the latch bolt D on the pin F.

In order to latch the members, the latch bolt D is first moved longitudinally with the nose 32 through the hole 13. The catch bolt C is then moved longitudinally until the nose 22 extends through the hole 33 and until the holes 23 and 14 are in alinement. The seal G is then inserted through the holes 23 and 14 and locked in the usual manner.

The formation of the pocket 15 provides the wall 24 in addition to the wall 11 to form a substantial support for the pin E and prevents the same from being removed. The formation of the pocket 19 by the walls 34 and 17 forms a substantial support for the pin F and prevents the same from being removed. The pocket 19 is closed at the top and open at the bottom to prevent ice or the like from forming in the pocket.

The apparatus shown and described provides a simple and easily operable latch mechanism in which the mechanism can not be tampered with and can not be unlatched without opening the seal.

I am aware that changes and modifications can be made in the apparatus as a whole and in the structure and arrangement of the parts thereof within the scope of the appended claims; therefore, without limiting myself to the precise apparatus shown and described nor to the precise structure and arrangement of parts as shown and described,

I claim:—

1. A latch mechanism including a bracket having a latch bolt receiving hole and a seal receiving hole through the same, a catch bolt movably supported on said bracket and having a nose and a seal receiving hole through the same located to aline with the seal receiving hole in the bracket when the mechanism is in latching condition, a bracket adjacent to the first said bracket, and a latch bolt movably supported on said adjacent bracket and having a nose extendable through said bolt receiving hole and having a bolt receiving hole for the nose of the catch bolt to extend through for latching the mechanism.

2. A latch mechanism including a bracket having a latch bolt receiving hole and a seal receiving hole through the same, a catch bolt movably supported on said bracket and having a nose and a seal receiving hole through the same located to aline with the first said seal receiving hole when the mechanism is in latching condition, a bracket having a pocket therein, and a latch bolt movably supported on said bracket with the pocket and extending into the pocket and having a nose extendable through said bolt receiving hole and having a bolt receiving hole for the nose of said catch bolt to be extended therethrough for latching the mechanism.

3. A latch mechanism including a bracket having a latch bolt receiving hole and a seal receiving hole through the same, a catch bolt movably supported on said bracket and having a nose and a seal receiving hole through the same and located to aline with the first said seal receiving hole when the mechanism is in latching condition, a bracket having a pocket therein, a movable latch bolt extending into said pocket and having a nose extendable through said bolt receiving hole and having a bolt receiving hole for the nose of said catch bolt to be extended therethrough for latching the mechanism, and a support means for said latch bolt extending through said bracket with the pocket and through said pocket and through said latch bolt and having a head on each end thereof each countersunk into said bracket with the pocket.

4. A latch mechanism including a bracket having two angular walls and rib means to stiffen the same, one of said walls having a latch bolt receiving hole through the same adjacent to said rib means, a bracket having a pocket therein, a catch bolt movably supported on the first said bracket and having a nose, a movable latch bolt extending into said pocket and having a nose extendable through said bolt receiving hole and having a bolt receiving hole for the nose of said catch bolt to be extended therethrough for latching of the mechanism, and a support pin for said latch bolt extending through said bracket with the pocket and through said pocket and through said latch bolt and having a head on each end thereof each countersunk into said bracket with the pocket.

5. A latch mechanism including a bracket having two angular walls and rib means to stiffen the same, one of said walls having a latch bolt receiving hole and a seal receiving hole through the same adjacent to said rib means, a bracket having a pocket therein, a catch bolt movably supported on the first said bracket and having a nose and a seal receiving hole through the same located to aline with the seal receiving hole in said one wall when the mechanism is in latching condition, a movable latch bolt extending into said pocket and having a nose extendable through said bolt receiving hole and having a bolt receiving hole for the nose of said catch bolt to be extended therethrough for latching of the mechanism, and a support pin for said latch bolt extending through said bracket with the pocket and extending through said pocket and through said latch bolt and having a head on each end thereof each countersunk into said bracket with the pocket.

6. A latch mechanism including bracket means and interengageable latch bolt means carried by said bracket means and a latch bolt supporting means including a pin extending through spaced walls of a bracket and through a latch bolt between said walls and having a head on each end thereof each countersunk into the corresponding one of said walls and having a shoulder thereon abutting the inner one of said walls.

7. A latch mechanism including a bracket having a seal receiving hole through the same, a latching member carried by said bracket and extendable through another latching member of the mechanism and having a seal receiving hole through one end thereof beyond the other latching member, and both of said holes located so that the same will come into alinement when the one latching member is extended through the other latching member.

In testimony of the foregoing, I affix my signature.

GEORGE DICKERSON.